(12) United States Patent
Caston, Jr.

(10) Patent No.: US 9,788,601 B2
(45) Date of Patent: Oct. 17, 2017

(54) SYSTEMS, DEVICES, AND METHODS FOR CONTROLLING FLUID FLOW TRANSFER IN SHOES

(71) Applicant: Gayford Caston, Jr., Durham, NC (US)

(72) Inventor: Gayford Caston, Jr., Durham, NC (US)

( * ) Notice: Subject to any disclaimer, the term of this patent is extended or adjusted under 35 U.S.C. 154(b) by 13 days.

(21) Appl. No.: 14/799,131

(22) Filed: Jul. 14, 2015

(65) Prior Publication Data

US 2017/0013915 A1    Jan. 19, 2017

(51) Int. Cl.
*A43B 13/20* (2006.01)
*A43B 7/14* (2006.01)
*F16F 9/10* (2006.01)

(52) U.S. Cl.
CPC .............. *A43B 13/203* (2013.01); *A43B 7/14* (2013.01); *A43B 13/206* (2013.01); *F16F 9/106* (2013.01)

(58) Field of Classification Search
CPC ............................ A43B 13/203; A43B 13/206
USPC ......................................................... 36/29, 93
See application file for complete search history.

(56) References Cited

U.S. PATENT DOCUMENTS

| 2,545,062 | A | * | 3/1951 | Whittington | ........... | A43B 17/08 |
| | | | | | | 36/3 B |
| 4,446,634 | A | * | 5/1984 | Johnson | ............... | A43B 13/206 |
| | | | | | | 36/28 |
| 4,999,932 | A | * | 3/1991 | Grim | ...................... | A43B 7/081 |
| | | | | | | 36/114 |
| 5,595,004 | A | * | 1/1997 | Lyden | .................... | A43B 13/20 |
| | | | | | | 36/153 |
| 5,669,161 | A | * | 9/1997 | Huang | ................. | A43B 1/0009 |
| | | | | | | 36/29 |
| 5,918,381 | A | | 7/1999 | Landry | | |
| 6,014,823 | A | * | 1/2000 | Lakic | ............... | A41D 19/01523 |
| | | | | | | 36/11.5 |

(Continued)

FOREIGN PATENT DOCUMENTS

EP    3117733    1/2017
FR    2915855 A1    11/2008

OTHER PUBLICATIONS

Extended European Search Report for European Application No. 16179184 dated Dec. 7, 2016.

(Continued)

*Primary Examiner* — Ted Kavanaugh
(74) *Attorney, Agent, or Firm* — Jenkins, Wilson, Taylor & Hunt P.A.

(57) ABSTRACT

The present subject matter relates to systems, devices, and methods for controlling fluid flow transfer in footwear in which a front chamber has a first inlet and a first outlet, a rear chamber has a second inlet and a second outlet, a first valve assembly is connected between the second outlet and the first inlet and is configured to allow fluid to pass unidirectionally from the rear chamber to the front chamber, and a second valve assembly is connected between the first outlet and the second inlet and is configured to allow fluid to pass unidirectionally from the front chamber to the rear chamber. In addition, one or both of the front chamber or the rear chamber can include one or more openings therethrough that are configured to allow fluid to pass into or out of the respective chamber with respect to a surrounding environment.

13 Claims, 8 Drawing Sheets

(56) References Cited

U.S. PATENT DOCUMENTS

6,170,173 B1 * 1/2001 Caston ................. A43B 13/203
  36/141
6,282,815 B1 * 9/2001 Caston ................. A43B 13/203
  12/142 V

OTHER PUBLICATIONS

European Notice of Publication for European Application No. 16179184 dated Dec. 21, 2016.

* cited by examiner

SYSTEMS, DEVICES, AND METHODS FOR CONTROLLING FLUID FLOW TRANSFER IN SHOES

TECHNICAL FIELD

The subject matter disclosed herein relates generally to the design of shock-absorbing soles in footwear. More particularly, the subject matter disclosed herein relates to systems, devices, and methods for controlling fluid flow transfer in footwear.

BACKGROUND

Transfer of fluid in the soles of footwear can be employed to achieve better shock absorption. In particular, the soles for such shock absorption footwear can be designed such that metered fluid transfer is provided throughout the foot and/or ankle, thus providing improved support for a user. In many cases, however, prior art fluid transfer devices have often been constructed based upon predetermined conditions that are applied regardless of the fact that different users can generally exhibit wide variations in shoe size or weight, which can result in the stock fluid transfer design being poorly adapted for providing the desired response to the user's activity.

It would therefore be desirable for shock absorption footwear to be designed to allow for adjusting the compression pressure level to accomplish fluid transfer based upon the weight and/or shoe size of a person wearing the shoe. In particular, it would be desirable for such a shoe structure to be capable of a quick and simple technique to vary and adjust the pressure within a fluid cavity corresponding to the weight and/or shoe size of the wearer.

SUMMARY

In accordance with this disclosure, systems, devices, and methods for controlling fluid flow transfer in footwear are provided. In one aspect, a fluid transfer system for shoes is provided. The system can include a front chamber having a first inlet and a first outlet, a rear chamber having a second inlet and a second outlet, a first valve assembly connected between the second outlet and the first inlet and configured to allow fluid to pass unidirectionally from the rear chamber to the front chamber, and a second valve assembly connected between the first outlet and the second inlet and configured to allow fluid to pass unidirectionally from the front chamber to the rear chamber. In addition, one or both of the front chamber or the rear chamber can include one or more openings therethrough that are configured to allow fluid to pass into or out of a respective one of the front chamber or the rear chamber with respect to a surrounding environment.

In another aspect, a fluid transfer system for shoes can include a front chamber having a plurality of front cross tubes and a substantially U-shaped first outer periphery tube that has a first inlet at one end and a first outlet at a second end substantially opposing the first end. Each of the plurality of front cross tubes can be connected at one end to a portion of the first outer periphery tube on a first side of the front chamber and extending towards an opposing side of the front chamber. The system can also include a rear chamber having a plurality of rear cross tubes and a substantially U-shaped second outer periphery tube that has a second inlet at one end and a second outlet at a second end substantially opposing the first end. Each of the plurality of rear cross tubes can be connected at one end to a portion of the second outer periphery tube on a first side of the rear chamber and extend towards an opposing side of the rear chamber. A first valve assembly can be connected between the second outlet and the first inlet and configured to allow fluid to pass unidirectionally from the rear chamber to the front chamber, and a second valve assembly can be connected between the first outlet and the second inlet and configured to allow fluid to pass unidirectionally from the front chamber to the rear chamber. In addition, one of the plurality of front cross tubes can include one or more openings therethrough that are configured to allow fluid to pass into or out of the front chamber with respect to a surrounding environment.

In yet another aspect, a method of controlling transfer of fluid flow in a shoe is provided. The method can include connecting a second outlet of a rear chamber of a fluid transfer system to a first inlet of a front chamber of the fluid transfer system using a first valve assembly and connecting a first outlet of the front chamber to a second inlet of the rear chamber with a second valve assembly. The first valve assembly can be configured to allow fluid to pass unidirectionally from the rear chamber to the front chamber, and the second valve assembly can be configured to allow fluid to pass unidirectionally from the front chamber to the rear chamber. Upon application of a pressure within the front chamber that exceeds a first predetermined value, the second valve assembly can be opened, and fluid from the front chamber can be directed into the rear chamber. Similarly, upon application of a pressure within the rear chamber that exceeds a second predetermined value, the first valve assembly can be opened, and fluid from the rear chamber can be directed into the front chamber. In addition, the method can include drawing fluid into the front chamber from a surrounding environment through one or more openings in the first chamber.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides systems, devices, and methods for controlling fluid flow transfer in shoes. In one aspect, the present subject matter provides a fluid transfer system for shoes in which the flow of fluids (e.g., air) between different portions of the shoe can be more particularly tailored to the user, which can allow for better shock absorption and comfort for the user.

Figure 1:
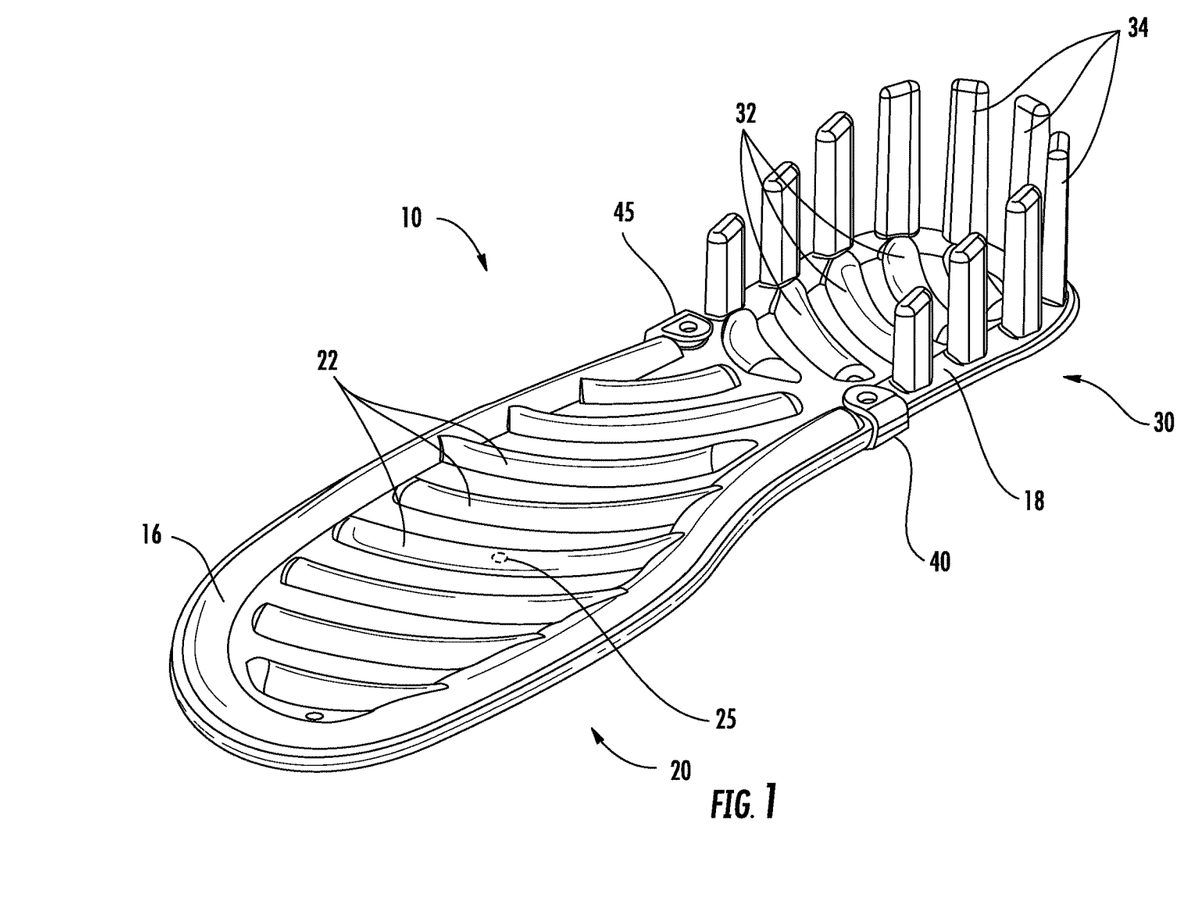
FIG. 1 is a perspective side view of a fluid transfer system for use in a shoe according to an embodiment of the presently disclosed subject matter.
Figure 2:
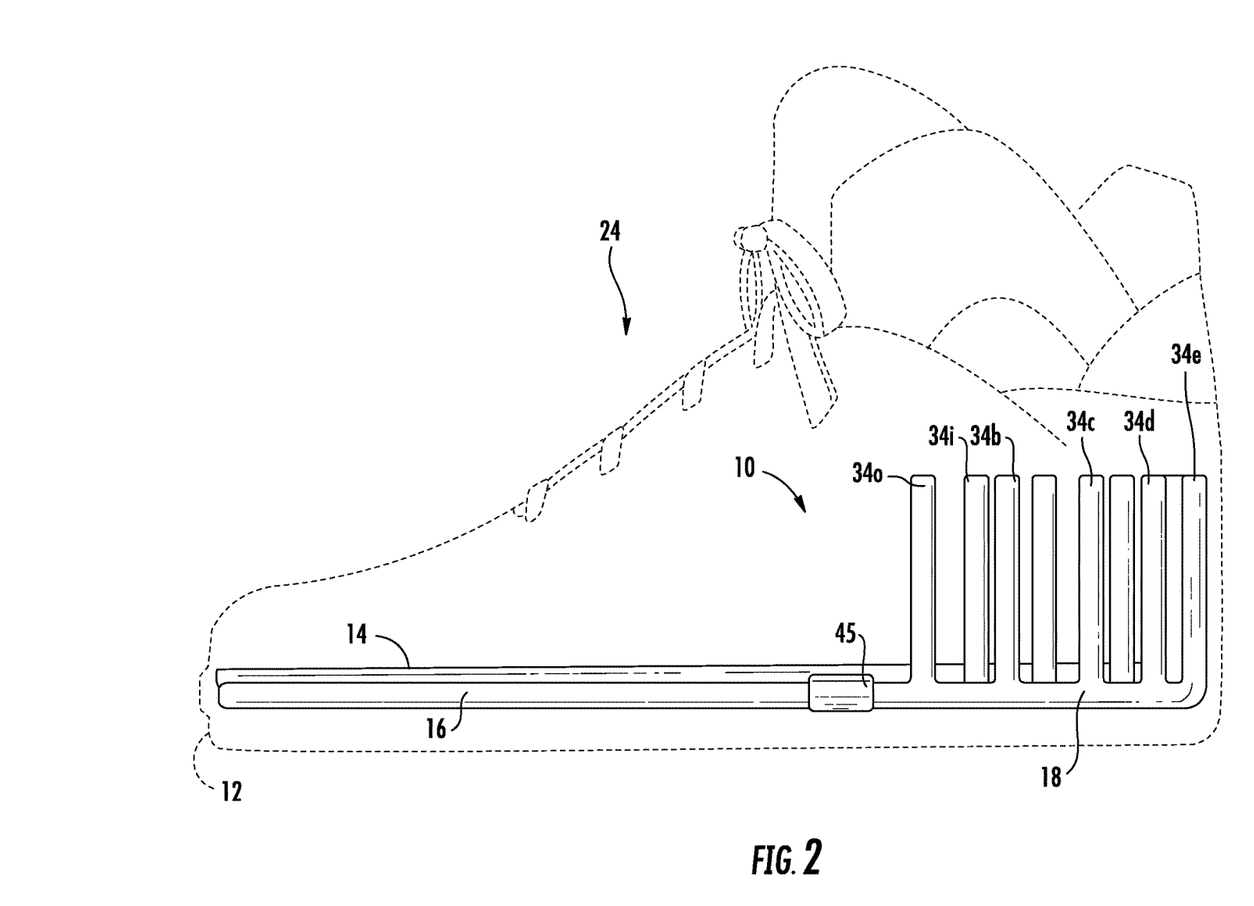
FIG. 2 is a side view of a fluid transfer system for use in a shoe according to an embodiment of the presently disclosed subject matter.

Referring to FIGS. 1, 2, 3A, and 3B, for example, an embodiment of fluid transfer system, generally designated 10, is illustrated. As shown in FIG. 2, fluid transfer system 10 can be designed to be incorporated into a shoe, generally designated 24, such as between an outer sole 12 and an inner sole 14. In this embodiment, fluid transfer system 10 has a front chamber, generally designated 20, that is configured to receive and support the forward part of the foot of a user. Front chamber 20 can have a first inlet 21a and a first outlet 21b to allow fluid to move into and out of front chamber 20 as desired. In some embodiments, front chamber 20 can have a first outer periphery tube 16 that is substantially U-shaped and includes first inlet 21a on one end and first outlet 21b on the opposing end. Front chamber 20 can further include a plurality of front cross tubes 22 that are each connected at one end to a portion of first outer periphery tube 16 and extend across front chamber 20. Specifically, for example, in the embodiment shown in FIGS. 3A and 3B, front cross tubes 22 include first through fifth front cross tubes 22a, 22b, 22c, 22d, and 22e that each extend from a position along first outer periphery tube 16 on a first side of front chamber 20 (e.g., near first inlet 21a) towards an opposing side of front chamber 20.

In addition, in some embodiments, a subset of front cross tubes 22 can be specifically positioned and designed to provide support and cushioning at the arch and/or instep region 60 of the user. In the particular configuration shown in FIGS. 3A and 3B, for example, front cross tubes 22 can include an outside arch inlet 62, a center arch inlet 64, and an inside arch inlet 66. In this configuration, these cross tubes can cushion the middle part of the user's foot that forms the instep (i.e., the metatarsus). Further in this regard, those having ordinary skill in the art will recognize that the principles discussed herein can be applied to any of a variety of other configurations beyond those illustrated.

In any configuration, each of the front cross tubes 22 connects with first outer periphery tube 16 to provide a plurality of fluid flow paths within front chamber 20. In this arrangement, when first outer periphery tube 16 and front cross tubes 22 are filled with fluid (e.g., air), front chamber 20 is able to provide a cushion for the phalanges/toes and for the ball portion of the foot of the user. In fact, as illustrated in FIGS. 1, 3A, and 3B, front cross tubes 22 can be curved or angled with respect to first outer periphery tube 16 towards the end of first outer periphery tube 16 that includes first inlet 21a such that fluid entering front chamber 20 can smoothly and readily flow into each of front cross tubes 22.

Figure 3A:
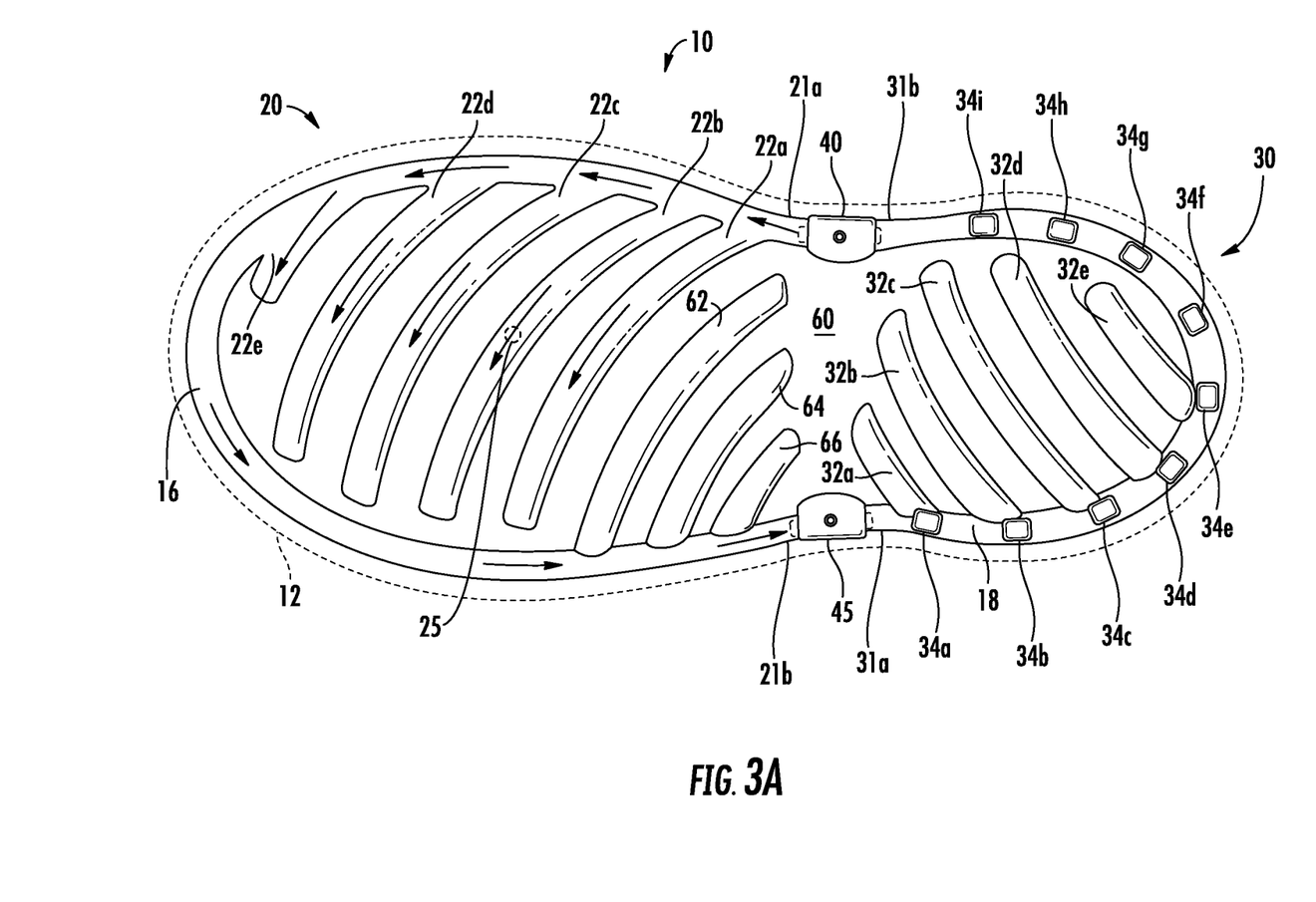
FIG. 3A is a top view of a fluid transfer system for use in a shoe according to an embodiment of the presently disclosed subject matter.
Figure 3B:
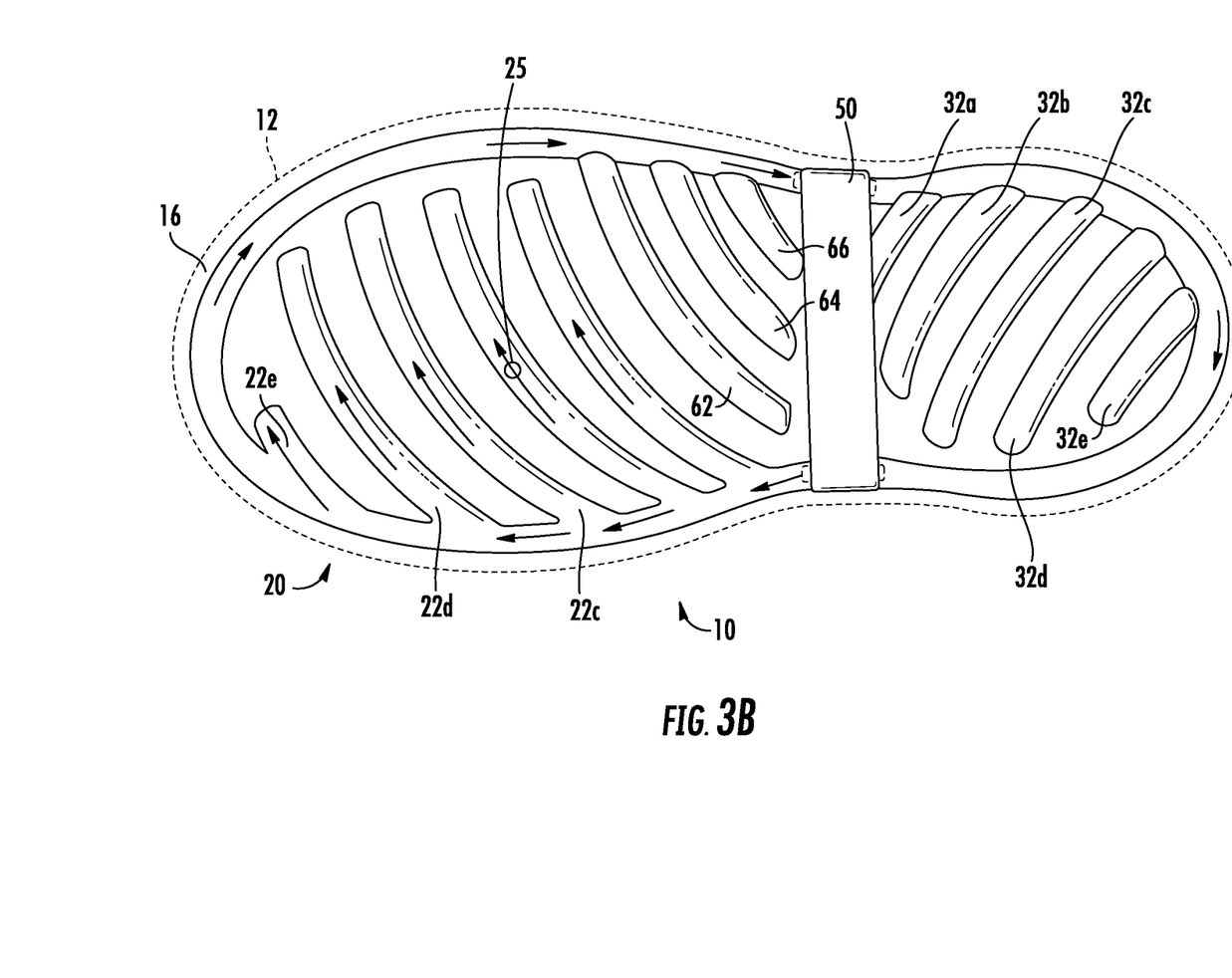
FIG. 3B is a bottom view of a fluid transfer system for use in a shoe according to an embodiment of the presently disclosed subject matter.

Referring again to the embodiment shown in FIGS. 1, 2, 3A, and 3B, fluid transfer system 10 can include a rear chamber, generally designated 30, that is configured to receive and support the rear part of the foot of the user. Rear chamber 30 can have a second inlet 31a and a second outlet 31b to allow fluid to move into and out of rear chamber 30 as desired. In some embodiments, for example, rear chamber 30 can include a second outer periphery tube 18 and a plurality of rear cross tubes 32 (e.g., first through fifth rear cross tubes 32a, 32b, 32c, 32d, and 32e are shown in FIGS. 3A and 3B) connected at one end to a position along second outer periphery tube 18 on a first side of rear chamber 30 and extending towards an opposing side of rear chamber 30. Each of the rear cross tubes 32 can be connected with second outer periphery tube 18 to provide a plurality of fluid flow paths within rear chamber 30 from second outer periphery tube 18 across the heel portion of the foot of the user. Furthermore, as illustrated in FIGS. 1, 3A, and 3B, rear cross tubes 32 can be curved or angled with respect to second outer periphery tube 18 towards the end of second outer periphery tube 18 that includes second inlet 31a such that fluid entering rear chamber 30 can smoothly and readily flow into each of rear cross tubes 32.

In addition, in some embodiments, fluid transfer system 10 can include a plurality of ankle channel fingers 34 (e.g., first through ninth ankle channel fingers 34a-34i are shown in FIG. 3) extending from rear chamber 30. In the particular configuration illustrated in FIGS. 1, 2, and 3A, for example, ankle channel fingers 34 are connected with second outer heel periphery tube 18 as shown in FIGS. 1 and 2. In this way, ankle channel fingers 34 can be configured to surround the ankle and stabilize the foot of the user.

To provide the transfer of fluid between front chamber 20 and rear chamber 30 that allows for the desired cushioning and absorption of impact, front chamber 20 and rear chamber 30 can be connected by a series of valve assemblies, which can be configured to control the timing and/or directionality of fluid flow between the chambers. In some embodiments, for example, first inlet 21a into front chamber 20 can be connected to second outlet 31b from rear chamber 30 by an adjustable first valve assembly 40. Specifically, referring to the embodiments illustrated in FIGS. 1, 2, and 3A, for example, first valve assembly 40 can be coupled between first outer periphery tube 16 and second outer periphery tube 18. Similarly, first outlet 21b from front chamber 20 can be connected to second inlet 31a into rear chamber 30 by an adjustable second valve assembly 45. Referring again to the embodiments illustrated in FIGS. 1, 2, and 3A, for example, second valve assembly 45 can be coupled between corresponding ends of first outer periphery tube 16 and second outer periphery tube 18.

Figure 4:
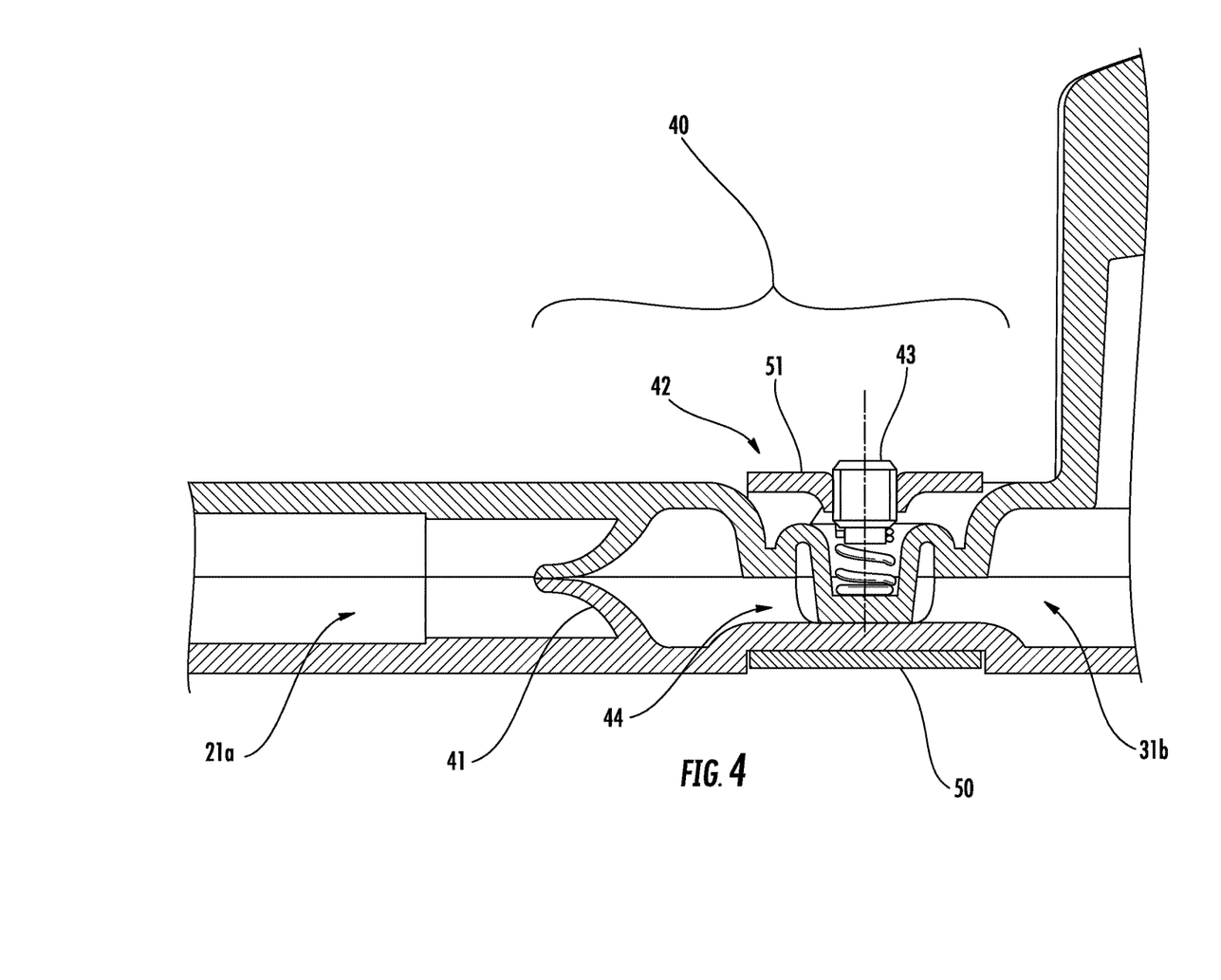
FIG. 4 is a side cutaway view of a first valve assembly of a fluid transfer system for use in a shoe according to an embodiment of the presently disclosed subject matter.

In some embodiments, one or both of first valve assembly 40 and second valve assembly 45 comprise one-way check valves that are each configured to allow fluid to flow unidirectionally between front chamber 20 and rear chamber 30. In particular, for example, first valve assembly 40 can include a first check valve 41 in communication between second outlet 31b and first inlet 21a as shown in FIG. 4. First check valve 41 can be configured to have a specified internal resistance to fluid pressure based upon a pressure at which it would be desirable for fluid to flow from rear chamber 30 into front chamber 20.

For example, for a given size of shoe 24 into which fluid transfer system 10 is incorporated, a correlation can be made to the expected weight of a person that would wear that size (e.g., a 9.5 to 11.0 shoe size may correspond with a user between 170-195). Based on this information, the average amount of pressure developed in rear chamber 30 when such a person walks or runs can be calculated, and the predetermined pressure at which first check valve 41 opens can be designed to correspond to a selected user weight within the expected range for users having the given shoe size. Thus, when the pressure reaches the predetermined value, first check valve 41 opens so that fluid can flow from rear chamber 30 into front chamber 20 (e.g., from second outer periphery tube 18 into first outer periphery tube 16). For example, the predetermined pressure at which first check valve 41 opens can be designed to correspond to the expected pressure developed in rear chamber 30 when the heel of a person having the minimum weight expected for the given shoe size strikes the ground during movement. In this way, even the lightest expected user of a given shoe will be able to receive the benefit of fluid transfer system 10.

Designing fluid transfer system 10 for a lightest expected user can result in the system being too compliant to heavier users, however, resulting in the amount of cushioning and support being less than desired. Therefore, to accommodate a wider range of users, first valve assembly 40 can be configured such that the static pressure at or near first check valve 41 can be controlled to be different than the pressure developed in rear chamber 30. In this way, the pressure in rear chamber 30 at which fluid flow into front chamber 20 is initiated can be adjusted to accommodate users of different sizes and weights, to adjust for users whose weight changes, and/or to otherwise modify the support and cushioning response of fluid transfer system 10 to movement by the user.

In the particular configuration shown in FIG. 4, for example, first valve assembly 40 can include a first flow regulator 42 that is configured to adjustably control the cross-sectional area of a first connection tube 44 connecting second outlet 31b and first check valve 41. Specifically, for example, a substantially rigid plate 50 can be provided on one side of fluid transfer system 10 (e.g., below fluid transfer system 10) as shown in FIG. 4, and a first bracket element 51 can be positioned on the other side of fluid transfer system 10 substantially opposing rigid plate 50. In some embodiments, first bracket element 51 can be connected to rigid plate 50 as shown in FIG. 1. A first adjustment device 43 associated with the first bracket element 51 can be moved with respect to first bracket element 51 towards or away from first connection tube 44 to adjust a force exerted on first connection tube 44 that can act to compress first connection tube 44 by a desired amount. Since a fluid's velocity must increase as it passes through a constriction in accord with the principle of continuity, its static pressure must thereby decrease. Accordingly, by constricting the cross-sectional area of first connection tube 44, the static pressure experienced at first connection tube 44 is thereby decreased in accord with the principle of conservation of mechanical energy. As shown in FIG. 4, for example, first adjustment device 43 can be a spring-biased set screw that is rotatable to adjust its position relative to first bracket element 51 to move toward or away from first connection tube 44. In this way, the pressure in rear chamber 30 that results in first check valve 41 opening can be adjusted.

Figure 5:
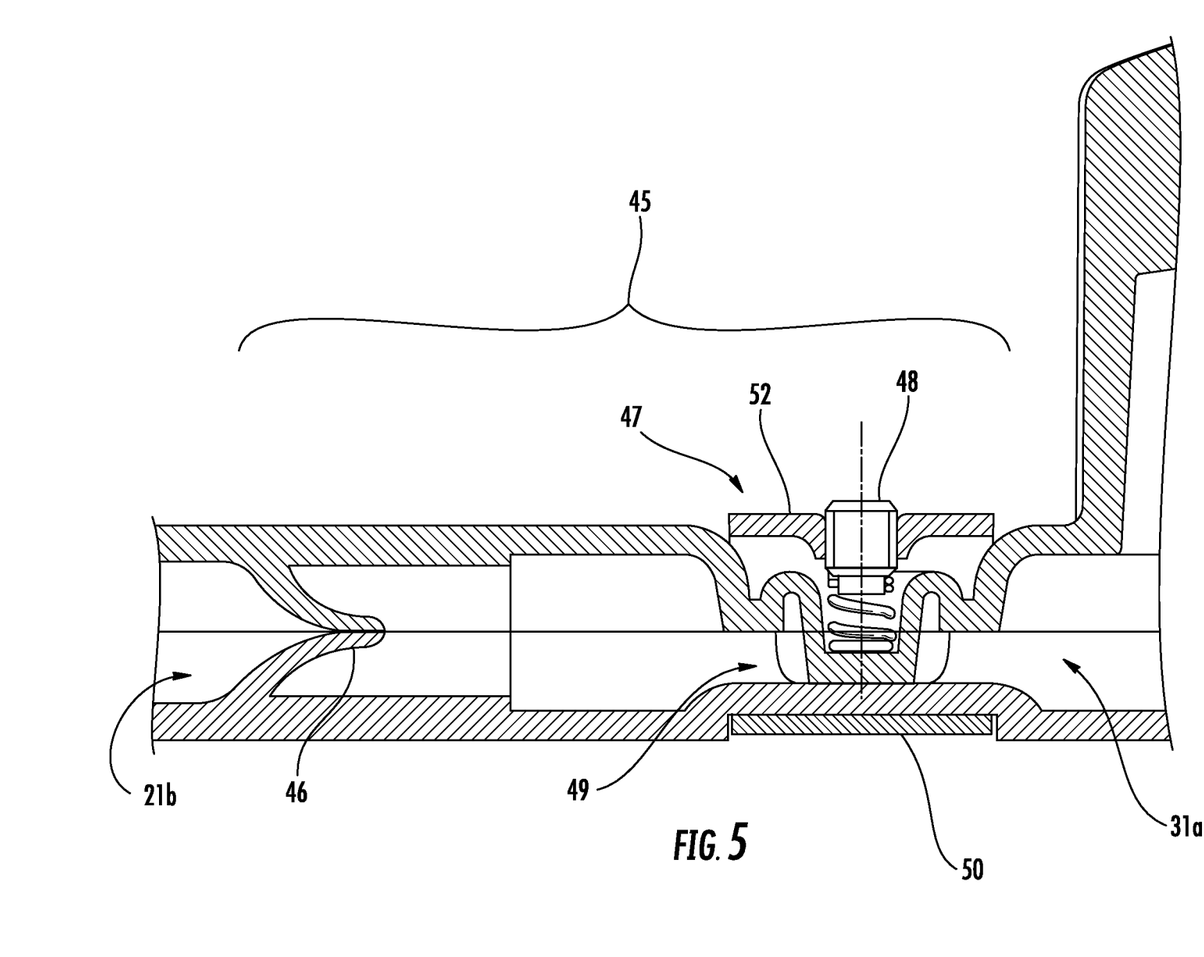
FIG. 5 is a side cutaway view of a second valve assembly of a fluid transfer system for use in a shoe according to an embodiment of the presently disclosed subject matter.

Similarly, second valve assembly 45 can include a second check valve 46 in communication between first outlet 21b and second inlet 31a as shown in FIG. 5. Second check valve 46 can be configured to have a specified internal resistance to fluid pressure based upon a pressure at which it would be desirable for fluid to flow from front chamber 20 into rear chamber 30. To control the pressure experienced at second check valve 46, second valve assembly 45 can be configured to control the static pressure at or near second check valve 46 to be different than the pressure developed in front chamber 20. In this way, the pressure in front chamber 20 at which fluid flow into rear chamber 30 is initiated can be adjusted to accommodate users of different sizes and weights and/or to modify the support and cushioning response of fluid transfer system 10 to movement by the user.

In the particular configuration shown in FIG. 5, for example, second valve assembly 45 can include a second flow regulator 47 that is configured to adjustably control the cross-sectional area of a second connection tube 49 connecting first outlet 21b and second check valve 46. Specifically, a second bracket element 52 can be positioned on an opposing side of fluid transfer system 10 from rigid plate 50. Again, in some embodiments, second bracket element 52 can be connected to rigid plate 50 as shown in FIG. 1. For example, rigid plate 50, first bracket element 51, and second bracket element 52 can all be formed integrally, with first bracket element 51 and second bracket element 52 being bent up and around first connection tube 44 and second connection tube 49, respectively, as shown in FIG. 1. A second adjustment device 48 (e.g., another spring-biased set screw) can be moved with respect to second bracket element 52 towards or away from second connection tube 49, which can correspondingly compress second connection tube 49 by a desired amount. In the same manner as discussed above, by constricting the cross-sectional area of second connection tube 49, the static pressure experienced at second connection tube 49 is thereby decreased. In this way, the pressure at which second check valve 46 is opened can be adjusted.

Figure 6:
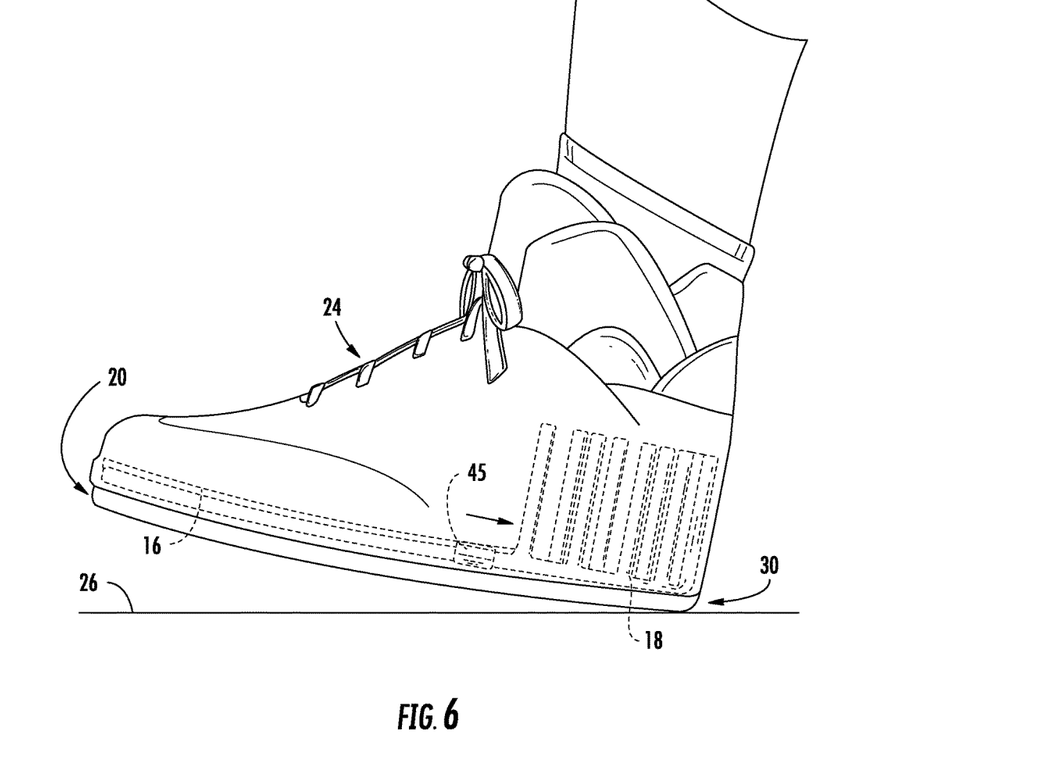
FIG. 6 is a side view of shoe incorporating a fluid transfer system as worn by a user showing how the heel portion of the foot first hits a support surface with the heel periphery tube being compressed.
Figure 7:
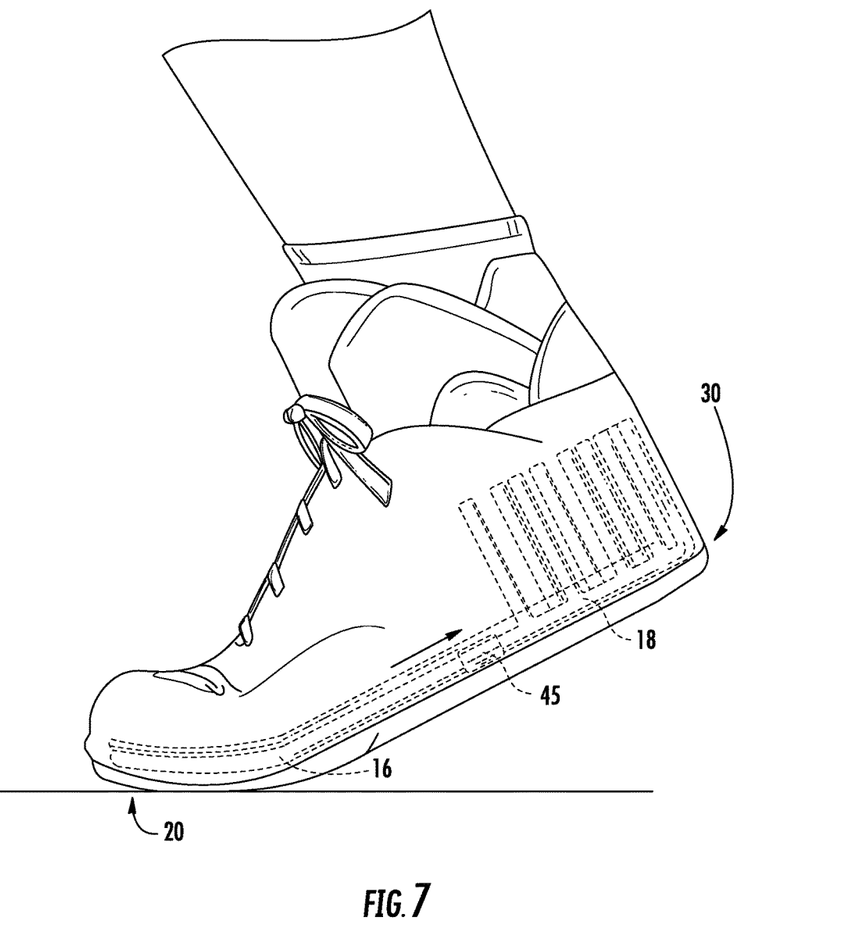
FIG. 7 is a side view of shoe incorporating a fluid transfer system when the weight of the user is on the ball portion of the foot with the toe periphery tube being compressed.

Regardless of the particular configuration, first and second valve assemblies 40 and 45 being connected between front and rear chambers 20 and 30 can control the flow of fluid between the chambers. As shown in FIGS. 6 and 7, for example, fluid transfer system 10 can be incorporated into shoe 24 to dynamically adjust the cushioning and support provided to a user in movement. Referring to FIG. 6, during the phase when the heel strikes the ground or support surface 26, fluid in the rear chamber 30 provides a cushioning effect. The weight of the user causes fluid in rear chamber 30, including second outer periphery tube 18 and rear cross tubes 32, to be compressed and forced in the direction indicated by the arrow through first valve assembly 40 into front chamber 20. As discussed above, the pressure at which fluid flows from rear chamber 30 through first valve assembly 40 into front chamber 20 is predetermined in accordance with the weigh of the user which usually corresponds with the shoe size, but this pressure level can be adjusted using first flow regulator 42.

FIG. 7 illustrates the phase when the user's foot moves from a completely flattened position to the position that the foot begins to push off with the toes flexed and the heel lifting from the ground or support surface 26. The weight of the user causes fluid in front chamber 20, including first outer periphery tube 16 and front cross tubes 22, to be compressed and forced in the direction indicated by the arrow through second valve assembly 45 into rear chamber 30. The pressure at which fluid flows from front chamber 20 through second valve assembly 45 into rear chamber 30 can be predetermined in accordance with the average weight of a user which may correspond with shoe size, but this internal pressure level that is required for fluid flow transfer can be adjusted either upward or downward using second flow regulator 47.

Furthermore, since first and second flow regulators 42 and 47 can be independently adjusted in some embodiments, different responses to the pressures developed in front chamber 20 and in rear chamber 30 can be achieved based on the particular mechanics of a user's movement or simply based on the user's preferences.

In addition, one or more opening can be provided through one or both of front chamber 20 and/or rear chamber 30 to a surrounding environment to provide a pressure release and/or air intake, which can further provide a desired level of cushioning in the operation of fluid flow system 10 when the user is in motion. Specifically, for example, FIGS. 1, 3A, and 3B illustrate embodiments in which an opening 25 is provided through one of front cross tubes 22. In particular, opening 25 can be positioned through one of front cross tubes 22 that is positioned at or about the center of gravity of the user in motion. In some embodiment, for example, opening 25 can be positioned through one of front cross tubes 22 that is configured to support a metatarsus of a foot of a user (e.g., through second front cross tube 22b shown in FIGS. 3A and 3B). Opening 25 can be a small slit or hole through the wall of one of front cross tubes 22, or it can include a valve assembly that is configured to open only under specified pressure conditions. In any configuration, opening 25 can allow some portion of the fluid within front chamber 20 to escape and/or to be drawn into front chamber 20 through opening 25. For example, in some embodiments, air can be drawn into front chamber 20 through opening 25 as fluid is transferred from front chamber 20 into rear chamber 30.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

What is claimed is:

1. A fluid transfer system for shoes comprising:
   a front chamber having a first inlet and a first outlet;
   a rear chamber having a second inlet and a second outlet;
   a first valve assembly connected between the second outlet and the first inlet and configured to allow fluid to pass unidirectionally from the rear chamber to the front chamber; and
   a second valve assembly connected between the first outlet and the second inlet and configured to allow fluid to pass unidirectionally from the front chamber to the rear chamber;
   wherein the front chamber comprises one or more openings through a bottom portion thereof that are configured to pass fluid into or out of the front chamber with respect to a surrounding environment when fluid passes from the front chamber to the rear chamber or from the rear chamber to the front chamber.

2. The fluid transfer system of claim 1, wherein the front chamber comprises:
   a substantially U-shaped first outer periphery tube that is connected to the first inlet at one end and to the first outlet at a second end substantially opposing the first end; and
   a plurality of front cross tubes, each of the plurality of front cross tubes being connected at one end to a portion of the first outer periphery tube on a first side of the front chamber and extending towards an opposing side of the front chamber; and
   wherein the rear chamber comprises:
   a substantially U-shaped second outer periphery tube that is connected to the second inlet at one end and to the second outlet at a second end substantially opposing the first end; and
   a plurality of rear cross tubes, each of the plurality of rear cross tubes being connected at one end to a portion of the second outer periphery tube on a first side of the rear chamber and extend towards an opposing side of the rear chamber.

3. The fluid transfer system of claim 2, wherein the plurality of front cross tubes comprises:
   a first plurality of front cross tubes connected to a portion of the first outer periphery tube on a side of the front chamber nearest to the first inlet and extending towards a side of the front chamber nearest to the first outlet; and
   a second plurality of front cross tubes connected to a portion of the first outer periphery tube on a side of the front chamber nearest to the first outlet and extending towards a side of the front chamber nearest to the first inlet.

4. The fluid transfer system of claim 3, wherein the first plurality of front cross tubes are positioned to support toes and a ball portion of a foot of a user; and
   wherein the second plurality of front cross tubes are positioned to support a metatarsus of the foot of the user.

5. The fluid transfer system of claim 2, wherein the one or more openings are positioned through one of the plurality of front cross tubes.

6. The fluid transfer system of claim 5, wherein the one or more opening are positioned through one of the plurality of front cross tubes that is positioned to support a metatarsus of a foot of a user.

7. The fluid transfer system of claim 1, wherein one or both of the first valve assembly or the second valve assembly comprises:
   a check valve connected to a respective one of the first inlet or the second inlet, the check valve being configured to open under a predetermined pressure;
   a connection tube connected between the check valve and a respective one of the second outlet or the first outlet; and
   a flow regulator associated with the connection tube, the flow regulator configured to adjustably control a cross-sectional area of the connection tube to adjust a static pressure in the connection tube.

8. The fluid transfer system of claim 7, wherein the flow regulator comprises:
   a bracket element positioned near the connection tube; and
   an adjustment device that is movable with respect to the bracket element towards or away from the connection tube to adjust a force exerted on the connection tube.

9. A fluid transfer system for shoes comprising:
   a front chamber comprising:
   a substantially U-shaped first outer periphery tube that has a first inlet at one end and a first outlet at a second end substantially opposing the first end; and
   a plurality of front cross tubes, each of the plurality of front cross tubes being connected at one end to a portion of the first outer periphery tube on a first side of the front chamber and extending towards an opposing side of the front chamber;
   a rear chamber comprising:

a substantially U-shaped second outer periphery tube that has a second inlet at one end and a second outlet at a second end substantially opposing the first end; and a plurality of rear cross tubes, each of the plurality of rear cross tubes being connected at one end to a portion of the second outer periphery tube on a first side of the rear chamber and extend towards an opposing side of the rear chamber;

a first valve assembly connected between the second outlet and the first inlet and configured to allow fluid to pass unidirectionally from the rear chamber to the front chamber; and a second valve assembly connected between the first outlet and the second inlet and configured to allow fluid to pass unidirectionally from the front chamber to the rear chamber;

wherein one of the plurality of front cross tubes comprises one or more openings through a bottom portion thereof that are configured to pass fluid into or out of the front chamber with respect to a surrounding environment when fluid passes from the front chamber to the rear chamber or from the rear chamber to the front chamber.

10. The fluid transfer system of claim 9, wherein the one or more openings are positioned through one of the plurality of front cross tubes.

11. The fluid transfer system of claim 10, wherein the one or more opening are positioned through one of the plurality of front cross tubes that is positioned to support a metatarsus of a foot of a user.

12. The fluid transfer system of claim 9, wherein one or both of the first valve assembly or the second valve assembly comprises:

a check valve connected to a respective one of the first inlet or the second inlet, the check valve being configured to open under a predetermined pressure;

a connection tube connected between the check valve and a respective one of the second outlet or the first outlet; and a flow regulator associated with the connection tube, the flow regulator configured to adjustably control a cross-sectional area of the connection tube to adjust a static pressure in the connection tube.

13. The fluid transfer system of claim 12, wherein the flow regulator comprises:

a bracket element positioned near the connection tube; and an adjustment device that is movable with respect to the bracket element towards or away from the connection tube to adjust a force exerted on the connection tube.

* * * * *